United States Patent [19]

Schertler

[11] Patent Number: 4,816,146
[45] Date of Patent: Mar. 28, 1989

[54] WATER AND OIL MIXTURE SEPARATOR

[76] Inventor: Harold D. Schertler, P. O. Box 435, Grand Isle, La. 70358

[21] Appl. No.: 184,440

[22] Filed: Apr. 21, 1988

[51] Int. Cl.$^4$ .............................................. B01D 23/00
[52] U.S. Cl. ..................................... 210/104; 210/170; 210/513; 210/522
[58] Field of Search ............... 210/744, 747, 800, 104, 210/170, 513, 521, 522

[56] References Cited

U.S. PATENT DOCUMENTS

| | | | |
|---|---|---|---|
| 3,893,918 | 7/1975 | Favret, Jr. ............................. | 210/84 |
| 4,198,300 | 4/1980 | Williams ................................ | 210/170 |
| 4,626,360 | 12/1986 | Senyard, Sr. et al. ................ | 210/521 |
| 4,720,341 | 1/1988 | Arnold .................................. | 210/522 |

FOREIGN PATENT DOCUMENTS

| | | |
|---|---|---|
| 114184 | 3/1929 | Austria . |
| 567461 | 10/1975 | U.S.S.R. . |
| 5340 | 2/1892 | United Kingdom . |

Primary Examiner—Richard V. Fisher
Assistant Examiner—C. Upton
Attorney, Agent, or Firm—John D. Jeter

[57] ABSTRACT

A separator for removing oil from a fluid mixture at a well site. An elongated conduit is arranged for support on an offshore structure and extends downward into a body of water into which cleaned water is to be discharged. The process fluid flows downward in the conduit past a series of baffles and out the lower end into the body of water. Quiescent regions at each baffle allows oil droplets to migrate into entrapment regions and be withdrawn up a riser connected to each entrapment region. A mixture inlet tube extends down to discharge below the topmost baffle. A fluid enclosure above the topmost baffle accepts the collected oil. An oil collection box is situated in the fluid enclosure and receives oil directly from the riser, some of which is allowed to flow out openings into the enclosure. An oil outlet standpipe collects oil from the oil box for removal. A gauge housing is positioned in the enclosure and is in communication with fluid in the enclosure to position a gauge to determine the top surface of the oil and the thickness of the oil body. The gauge regulates flow controls to control mixture inflow and oil outflow.

The baffles are conical, opening upward, with a central opening. A flow spreader is situated below the opening to cause flowing mixture to follow a tortuous path.

19 Claims, 1 Drawing Sheet

WATER AND OIL MIXTURE SEPARATOR

This invention pertains to the separation of hydrocarbons from fluid mixtures derived from well site operations and well production fluids. More specifically, this invention relates to activities commonly known as skim pile construction and operation.

BACKGROUND OF THE INVENTION

Production fluids and the fluids inherent in well site operations are often complex mixtures containing oil, water, natural gas, sand, rust scale and low density debris. There are oil, water and gas separators well known to those skilled in the art of petroleum production that are efficient in separating the usual production at high rates but will not produce water clean enough to be environmentally acceptable. Sand and low density debris can be removed at high rates by well known techniques. Effluent water from the high rate separators often requires further processing and the water to oil ratio is often rather high.

Very small bodies, or particles, of oil dispersed in water will usually float upward but the rate may be so slow that unacceptably large holding tanks would be required to use that approach. Additionally, small particles of oil may adhere to heavier random particles and fail to rise at all in water.

Water containing dispersed oil can be tumbled or rolled to cause oil particles to coalesce into larger particles that will rise faster. If the agitation is too violent, the opposite effect will be realized. The amount of agitation needed to cause coalescence of oil particles maY not be conducive to selective migration of the coalesced particles while in the region agitated. It follows, then, that there is advantage in agitation iollowed by relative quiescence in the general migration of the fluid body being processed. Further, repeated sequences of agitation and quiescence continues to improve the quality of water destined to become efiluent.

Quiescence has a singular quality requiring little attention but agitation has qualities that do influence results. The ideal agitation has little value if it exists in only selected regions of the stream progressing through an enclosure. An ideal agitation, to be most effective, will subject all the fluid stream to the same effect. Baffles in the structure directing the stream being processed have been found quite effective but they are often of such shape that they agitate one part of the stream more than another. Baffles may still do what is required but more baffles may be required and needed dimensions are not always available.

Fluids to be separated at different sites, and fluids from the same site at different times, may vary enough to require fine tuning of the fluid handling process. Fine tuning to optimize a baffle system can be more readily accomplished if the agitation region is reasonably homogeneous. Adjustment of the flow rate through the baffle system is the usual fine tuning procedure. If the agitation of the stream is not homogeneous, flow rate adjustment merely shifts the ideal agitation level to a different part of the stream, with too little agitation in one region and too much in another.

Each baffle commonly receives some separated oil in the quiescent region. It is rather important that the oil be removed from each quiescent region without further agitation until the oil is confined for removal to a collection region.

It is therefore an object of this invention to provide a baffle type fluid separator with fluid processed through the agitation region such that the stream is agitated with reasonable uniformity.

It is a further object of this invention to provide a baffle type fluid separator with quiescent regions for light element collection having means to withdraw collected fluids without further agitation until extracted from the quiescent region.

It is yet another object of this invention to provide an oil collector riser tube full length of the baffle structure to reduce extraction velocity to allow water particles in the oil to separate after oil extraction is underway.

It is still another object of this invention to provide an oil collection box slip jointed to the oil collection riser to simplify installation without welding at the well site.

These and other objects, advantages, and features of this invention will be apparent to those skilled in the art from a consideration of this specification, including the attached claims and appended drawings.

SUMMARY OF THE INVENTION

A separator column for removing oil from an oil and water mixture is arranged inside an elongated conduit adapted to be supported with the centerline vertical to be attached to an offshore structure and to extend down into a body of water that is to receive the cleaned water as effluent.

Inside tbe conduit, the fluid mixture to be processed flows generally downward, through a vertically spaced series of baffles, with the cleaned water finally discharged at the bottom. Oil separates from the mixture, some at each baffle, and is collected by a vertical riser tube that extends from the lower baffle to an oil collection box above the top baffle.

Each baffle is a truncated cone opening upward with the major diameter circumferentially welded to the inside wall of the conduit. Each baffle has a generally central opening with a flow spreader plate spaced just below the opening. A cover plate at the top of the conduit provides an oil collection enclosure above the top baffle. Each baffle provides an oil entrapment at the baffle to conduit juncture and is a zone or region of quiescence. Oil droplets coalesce in the flow agitation caused by the flow spreaders and rises into the entrapment region when the spread flow becomes quiescent.

From external plumbing, incoming mixture flow enters a tube that sealingly penetrates the cover plate and extends down to discharge fluid between the opening and flow spreader of the top baffle. Collected oil at each baifle is conducted by a branch tube that rises from the entrapment, some distance and is tee connected to the riser. The riser itself serves as the branch for the bottom bafile and rises vertical and uninterruptedly into the oil collection enclosure.

An oil collection box is situated in the oil collection enclosure and an oil extraction standpipe sealingly penetrates the cover plate and extends to an open end just above the bottom of the box. That standpipe, which may include a submersible pump is adapted to connect to external plumbing for handling oil. The box is connected at the bottom to the riser and is perforated to allow collected oil to enter the surrounding enclosure.

There are provisions to house and support a fluid level gauging device in the upper enclosure to determine the level of the top surface of the oil and the oil and water separation plane. The gauge controls mixture inflow and oil outflow controls commercially available to maintain the oil surface and separation plane between preselected limits.

A water sample extraction tube is sealingly supported to penetrate the cover plate, extend down the riser tube and into the cleaned water region below the bottom baffle for water sample extraction by appropriate external plumbing.

In the collected oil, some water droplets remain and provisions for those droplets to separate from the oil and migrate to the bottom of the conduit further improves oil quality. Water droplets in the collected oil fluid body above the top baffle can migrate downward and move through the top baffle opening around the inlet tube to rejoin the downflowing mixture. The riser tube is of such diameter that upward movement of collected oil is slower than the settling rate of coalesced water droplets. The oil collection box and the extraction riser similarly permits downward migration of coalesced water droplets.

BRIEF DESCRIPTION OF DRAWINGS

In the drawings wherein like captions refer to like features.

DETAILED DESCRIPTION OF DRAWINGS

In the interest of descriptive clarity, ancillary structural details such as supports and attachments, pipe dlanges and the like are omitted unless they bear upon the points of novelty. Process fluid preconditioning apparatus, such as filter screens and the like, will normally be present but not related in a novel manner and are not shown.

Figure 1:
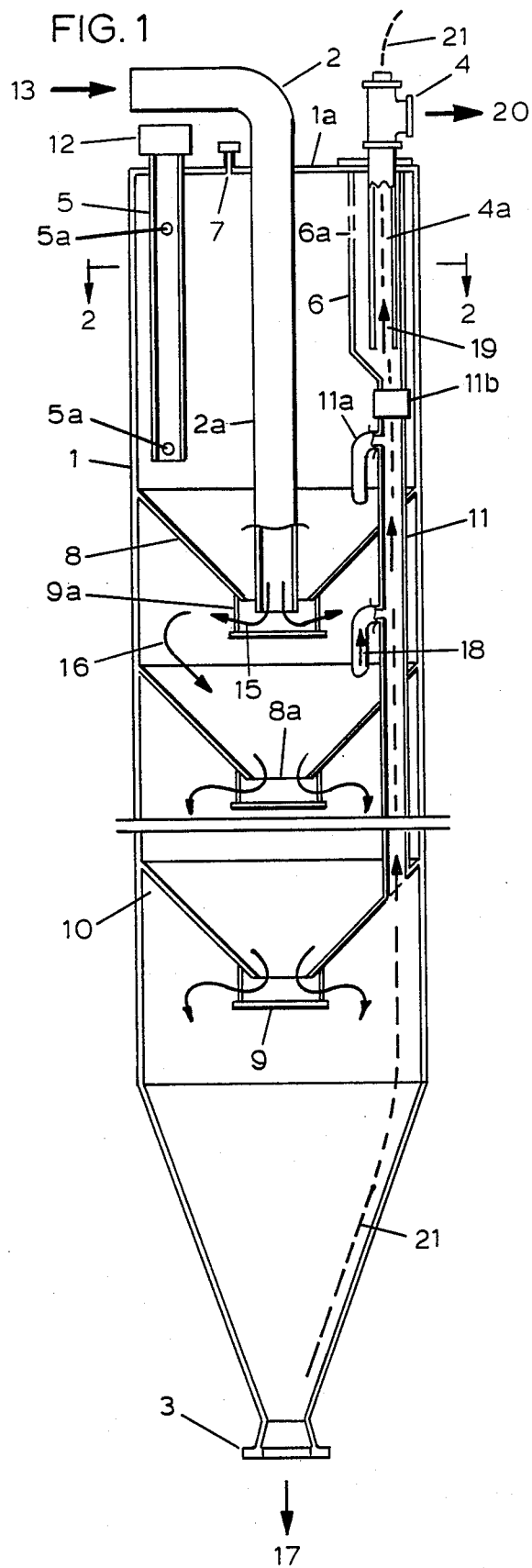
FIG. 1 is a side view, mostly cut away, of the preferred embodiment of the invention.

In FIG. 1, the general enclosure is in a large diameter pipe, or conduit 1. Baffles 8 are truncated cones opening upward with the major dimension welded circumferentially to the inside wall of the conduit. The baffles have generally central circular openings 8a at the bottom. Flow spreaders 9 depend from the bafile lower surfaces on support rods 9a and are positioned somewhat below the openings 8a. The baffle and conduit unctures form quiescent oil entrapment regions 10.

The conduit is closed at the top by a plate 1a. The plate supports oil collection box 6 and outlet standpipe 4a. Atmosphere vent 7, which may collect gas for removal from the enclosure, is peripherally welded to and opens below the plate.

Fluid inlet 2 penetrates and is peripherally welded to the plate and extends downward into the enclosure. Fluid inlet standpipe 2a extends down the general center of the enclosure and opens just below opening 8a of the top baffle.

Oil extraction riser 11 penetrates and is welded circumferentially to the baffles. Riser 11 ends at and opens below the lower baffle. Above each baffle an oil extraction branch pipe is connected to riser 11 and extends down to and is circumferentially welded to a matching opening in the baffle to tap oil from the quiescent region 10.

Oil and water mixture flows (13) into inlet 2, down standpipe 2a, is deflected (15) by the top flow spreader 9a, is agitated somewhat by flow turbulence, but becomes more quiescent in the larger diameter of the conduit Some oil particles migrate to region 10 of the upper baffle. Water flow (16) at low velocity reverses and continues downward in the conduit toward the next baffle, and the process continues through the series of bafiles below. Oil particles in the quiescent region 10 coalesce and move (18) up branch 11a to riser 11 at each baffle. The downwardly continuing flow rate is reduced as oil is removed and the openings 8a are made progressivel smaller in diameter. Finally, the cleaned water flows (17) out water outlet 3.

Above the top baffle an oil collection box 6 is secured inside the conduit and is connected, for construction convenience, to a fluid tight telescoping slip joint to the riser 11. Box 6 has perforations 6a to permit collected oil to flow into the conduit above the top baffle. An oil outlet standpipe 4a has an open lower end positioned just above the lower end of box 6. Oil flowing up riser 11 collects in box 6 and is withdrawn (19) through standpipe 4a and flows (20), usually with pump assistance, out of oil outlet 4.

Gauge enclosure 5 houses sensors for fluid level gauge 12. Vents 5a open enclosure 5 to the general enclosure. Gauge 12 is an available level sensor well known in the industry. Gauge 12 can detect the upper surface of the oil and the separation plane between oil and water below. Otherwise stated that gauge can detect the upper and lower surface of the oil body collected at the uPPer end of the conduit. The gauge regulates fluid mixture inflow and oil outflow to maintain the two oil surfaces between preselected limits.

Sample tube 21 passes through a packing hanger at the top of the oil outlet, continues down standpipe 4a, into and through riser 11 to extend some distance below the lower baffle to extract sample fluid.

Figure 2:
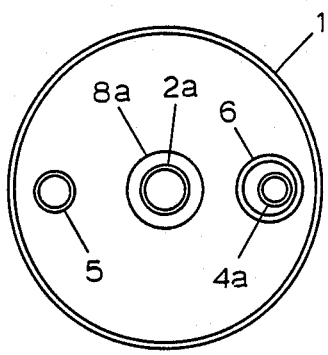
FIG. 2 is a sectional view taken along line 2—2 of FIG. 1.

FIG. 2 represents a section cut at line 2—2 of FIG. 1. In conduit 1, standpipe 2a is shown to be generally central with gauge enclosure 5 and oil collection box 6 displaced laterally. Outlet standpipe 4a, in box 6 is a conduit for sample line 21.

Figure 3:
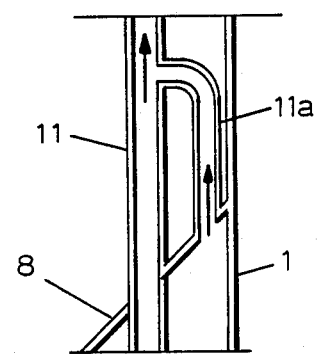
FIG. 3 is a side view, in cut-away, somewhat enlarged, of the preferred baffle-to-riser tube connections.

FIG. 3 may be regarded more schematic than structurally exact. The top of baffle 8 is welded to the conduit 1. Riser tube 11 penetrates this baffle which maY be regarded as the second from the top baffle. All but the bottom baffle has the branch 11a, a pipe opening beIow the baffle into the quiescent region 10, rising some distance and being fluidly connected to the riser. Upward flow through the riser does not agitate the quiescent region. Riser 11 is actually closer to the conduit wall.

Figure 4:
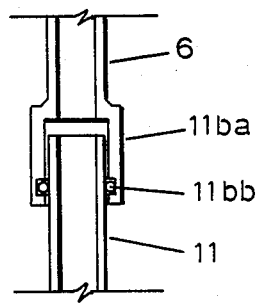
FIG. 4 is a side view, in cut-away, somewhat enlarged, of an optional slip-joint feature for connecting internal parts on-site without welding.

FIG. 4, represents the slip joint 11b, somewhat enlarged, of FIG. 1. Box 6 has collar 11ba with seal 11bb adapted to sealingly accept the top end of riser 11.

From the foregoing, it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As any possible embodiments may be made of the apparatus and method of this invention without departing from the scope thereof, it is to be understood that all latter herein set forth or shown in the accompanying drawings is to be interpreted as illustrative and not in a limiting sense.

What is claimed is:

1. An improved separator for recovering oil from an oil containing fluid mixture and disposing of relatively clean fluid into a body of water into which the separator extends, the improved separator comprising:

(a) an elongated conduit adapted to be supported, with centerline generally vertical, by an offshore structure and to extend downward into a body of water, with inlet means to conduct a fluid mixture into the upper end of the conduit, water outlet means to discharge water from the lower end of the conduit, and oil outlet means to extract collected oil from the upper end of the conduit, with a vertically spaced plurality of baffles disposed within the conduit;

the improvement comprising:

(b) Each of said plurality of baffles comprising a truncated cone, opening upwardly, with the major diameter sealingly secured to the inside surface of said conduit to provide an oil entrapment region below the baffle to conduit juncture, each baffle having a generally central opening;

(c) a flow spreader means disposed and supported below said opening of each of said baffles, arranged to cause fluid flowing downward through said openings to spread into a wider flow path;

(d) a riser tube, extending generally parallel to said centerline, adapted to communicate collected oil from said entrapment region of each baffle to an oil collection box;

(e) an oil collection box situated above the topmost of said baffles, in communication with said riser tube, said box having at least one opening to allow collected oil to flow into an upper chamber above said topmost baffle;

(f) said inlet means comprising an inlet tube adapted to fluidly connect to an external fluid mixture source and arranged to extend into said conduit to discharge fluid below said opening in said topmost baffle and above the topmost said spreader means;

(g) said oil outlet means comprising a standpipe arranged to conduct collected oil from near a lower end of said box to external oil collection means;

(h) a lower chamber in said conduit below the bottommost of said baffles, with an opening in the lower end of said lower chamber to function as said water outlet means.

2. The improvement of claim 1 wherein said riser is connected fluidly to said oil entrapment regions by a channel extending upward from said region some distance before entering said riser.

3. The improvement of claim 1 wherein said riser extends through said baffles.

4. The improvement of claim 3 wherein said riser is terminated at said bottommost baffle and is fluidly communicated with said entrapment region below said bottommost baffle without a separate channel between said region and said riser.

5. The improvement of claim 1 wherein said oil collection box is fluidly connected to said riser by a telescoping slip joint connector to avoid on-site welding of that connection.

6. The improvement of claim 1 wherein said standpipe, said oil collection box and said riser provide a reasonably straight, uninterrupted downflow path for migration of water droplets remaining in said downflow path.

7. The improvement of claim 1 wherein a sampling tube is disposed within said standpipe and continues downward along said riser, into said lower chamber and extends above said conduit, with means to fluidly connect with external sampling means.

8. The improvement of claim 1 wherein said conduit is provided with a sealingly associated cover arranged to seal said upper chamber from ambient atmosphere.

9. The improvement of claim 8 wherein said cover is provided with vent means to conduct gas to external gas handling means.

10. The improvement of claim 1 wherein a gauge housing is situated to extend, generally parallel said centerline into said upper chamber, arranged to house means to detect the upper surface of oil and the oil and water separation plane in said upper chamber to regulate external flow controls to control inflow of fluid mixture and outflow of collected oil to maintain said upper surface and said separation plane between preselected locations.

11. An improved separator for use in a body of water, supported by an offshore structure, to separate water and oil from a fluid mixture, the improved separator comprising:

(a) an elongated conduit, disposed with centerline vertical, having a plurality of baffles vertically spaced and disposed therein to define an upper chamber above the topmost of said baffles, a lower chamber below the bottommost of said baffles and intermediate chambers between said baffles, and a tortuous flow channel extending from said upper chamber to said lower chamber;

(b) inlet means adapted to deliver fluid mixture from and external source into said conduit, a water outlet means adapted to discharge water from said lower chamber to said body oi water, and an oil outlet to remove collected oil from said conduit to remote receiving means;

the improvement comprising:

(c) said baffles describing a truncated cone, opening upwardly, with the major diameter sealingly attached to the inner surface of said conduit to provide an oil entrapment region below said baiile and conduit attachment juncture, and a generally central opening at the lower end of said cone;

(d) flow spreader means situated below said opening, arranged to spread the path of downward flowing fluid;

(e) said inlet means arranged to deliver fluid mixture from a remote source and to inject said fluid mixture below said opening in said topmost baffle and above said spreader means;

(f) said oil outlet means comprising a tubular riser extending from said entrapment region in said lower chamber to said upper chamber, said riser in fluid communication with said entrapment regions by way of a branch tube extending from said riser to said entrapment regions; an oil collection box, with an upper and a lower end, situated in said upper chamber, arranged to receive collected oil from said riser near said lower end, with means to conduct oil to said upper chamber when oil is above a preselected distance from said lower end, and an oil removal standpipe opening near said lower end and extending to said remote oil receiving means.

12. The separator of claim 11 wherein said riser is inside said conduit and sealingly penetrates said baffles.

13. The separator of claim 11 wherein said conduit has a sealingly associated cover with vent means to conduct gas to a remote receiving means.

14. The separator of claim 11 wherein gauge means is situated in said upper chamber adapted to detect the upper surface of collected oil and the oil and water separation plane therein to provide control signals to remote flow controls to regulate fluid mixture inflow and collected oil outflow to maintain said surface and said separation between prescribed limits.

15. The separator of claim 14 wherein said gauge means is housed in a housing situated to extend into said upper chamber.

16. The separator of claim 11 wherein said oil removal standpipe is generally vertical and a sample tube is sealingly situated therein to extend down said standpipe and said riser to conduct sample fluid from said lower chamber to remote sample collecting means.

17. The separator of claim 11 wherein said oil collection box is fluidly connected to said riser by a sealed slip joint connection.

18. The separator of claim 11 wherein said openings in said baffles have smaller diameters in the lower baffles than in the topmost baffle.

19. The separator of claim 11 including means providing a downward flow path for water droplets in collected oil from said upper chamber, said oil collection box, said standpipe and said riser to said lower chamber.

* * * * *